(12) United States Patent
Plavcan et al.

(10) Patent No.: US 11,962,136 B2
(45) Date of Patent: Apr. 16, 2024

(54) CORD CONNECTOR

(71) Applicant: Hubbell Incorporated, Shelton, CT (US)

(72) Inventors: Daniel James Plavcan, Stratford, CT (US); James Peter Quinn, Jr., Clinton, CT (US)

(73) Assignee: Hubbell Incorporated, Shelton, CT (US)

(*) Notice: Subject to any disclaimer, the term of this patent is extended or adjusted under 35 U.S.C. 154(b) by 66 days.

(21) Appl. No.: 17/545,095

(22) Filed: Dec. 8, 2021

(65) Prior Publication Data

US 2022/0196186 A1 Jun. 23, 2022

Related U.S. Application Data

(60) Provisional application No. 63/127,479, filed on Dec. 18, 2020.

(51) Int. Cl.
| | | |
|---|---|---|
| *H02G 3/06* | (2006.01) | |
| *F16L 5/02* | (2006.01) | |
| *H01B 7/00* | (2006.01) | |
| *H01B 17/58* | (2006.01) | |

(52) U.S. Cl.
CPC .............. *H02G 3/0616* (2013.01); *F16L 5/02* (2013.01); *H01B 7/0045* (2013.01); *H01B 17/583* (2013.01)

(58) Field of Classification Search
CPC .... H02G 3/0616; H02G 3/0625; H02G 3/065; H01B 17/583; H01B 17/586; H01B 7/0045; F16L 5/02

USPC ......................................... 439/296, 449, 460
See application file for complete search history.

(56) References Cited

U.S. PATENT DOCUMENTS

| | | | |
|---|---|---|---|
| 3,445,805 A | 5/1969 | McLoad | |
| 7,857,647 B2* | 12/2010 | Bracci | H01R 13/5205 439/282 |
| 2022/0196186 A1* | 6/2022 | Plavcan | H02G 3/0675 |

FOREIGN PATENT DOCUMENTS

| | | |
|---|---|---|
| DE | 10356386 B3 | 5/2005 |
| EP | 0333982 A1 | 9/1989 |
| EP | 3185379 A1 | 6/2017 |
| WO | 2020141382 A1 | 7/2020 |

OTHER PUBLICATIONS

International Search Report dated Feb. 25, 2022 for corresponding International Application No. PCT/US2021/062327 (3 pages).

* cited by examiner

*Primary Examiner* — Khiem M Nguyen
(74) *Attorney, Agent, or Firm* — Robinson + Cole LLP

(57) ABSTRACT

A cord connector may be used for holding one or more cords. The cord connector includes a first body, a second body, and a bushing. The second body is removably coupled to the first body. The bushing is disposed between the first body and the second body. The bushing includes at least two bushing passages extending from a first end of the bushing toward a second end of the bushing. Each bushing passage is sealed with a membrane. The membrane is disposed within the bushing passage between the first end and the second end. The membrane is configured to be pierced to open the bushing passage.

20 Claims, 14 Drawing Sheets

CORD CONNECTOR

RELATED APPLICATIONS

This application is based on U.S. Provisional Application Ser. No. 63/127,479, filed Dec. 18, 2020, the disclosure of which is incorporated herein by reference in its entirety and to which priority is claimed.

FIELD

Embodiments described herein relate to a cord connector. More particularly, embodiments described herein relate to a cord connector capable of connecting multiple cords.

SUMMARY

The present disclosure relates, in one aspect, to a cord connector for holding one or more cords. The cord connector includes a first body, a second body, and a bushing. The second body is removably coupled to the first body. The bushing is disposed between the first body and the second body. The bushing includes at least two bushing passages extending from a first end of the bushing toward a second end of the bushing. Each bushing passage is sealed with a membrane. The membrane is disposed within the bushing passage between the first end and the second end. The membrane is configured to be pierced to open the bushing passage.

The present disclosure relates, in another aspect, to a cord connector for holding one or more cords. The cord connector includes a first body, a second body, and a bushing. The first body includes a first passage defined therein. The second body includes a second passage defined therein. The second body is removably coupled to the first body. The bushing is disposed in at least one of the first passage and the second passage. The bushing includes a plurality of bushing passages defined therein. Each bushing passage is at least partially blocked by a continuation of the bushing that spans across a width of the bushing passage.

The present disclosure relates, in another aspect, to a method of using a cord connector. The method includes routing a wire through a first passage of a first body, piercing a membrane disposed in a bushing passage of a bushing, opening the bushing passage, routing the wire through the bushing passage, routing the wire through a second passage of a second body, coupling the first body to the second body, and trapping the bushing between the first body and the second body.

Other aspects of the embodiments will become apparent by consideration of the detailed description and accompanying drawings.

DETAILED DESCRIPTION

The present disclosure illustrates two embodiments of cord connectors 100, 200. Of course, this disclosure may contemplate other additional cord connectors. Features from one embodiment may be included or omitted in another embodiment to create yet another embodiment, for instance.

Figure 1:
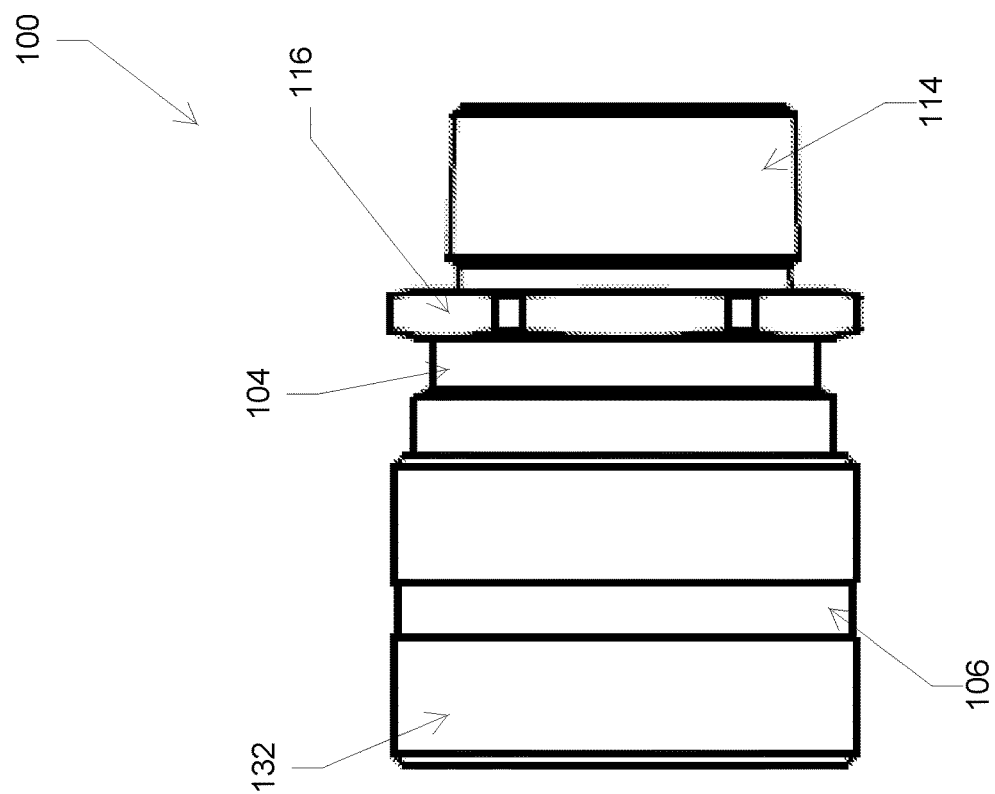
FIG. 1 illustrates a side elevation view of a cord connector, according to embodiments described herein.
Figure 2:
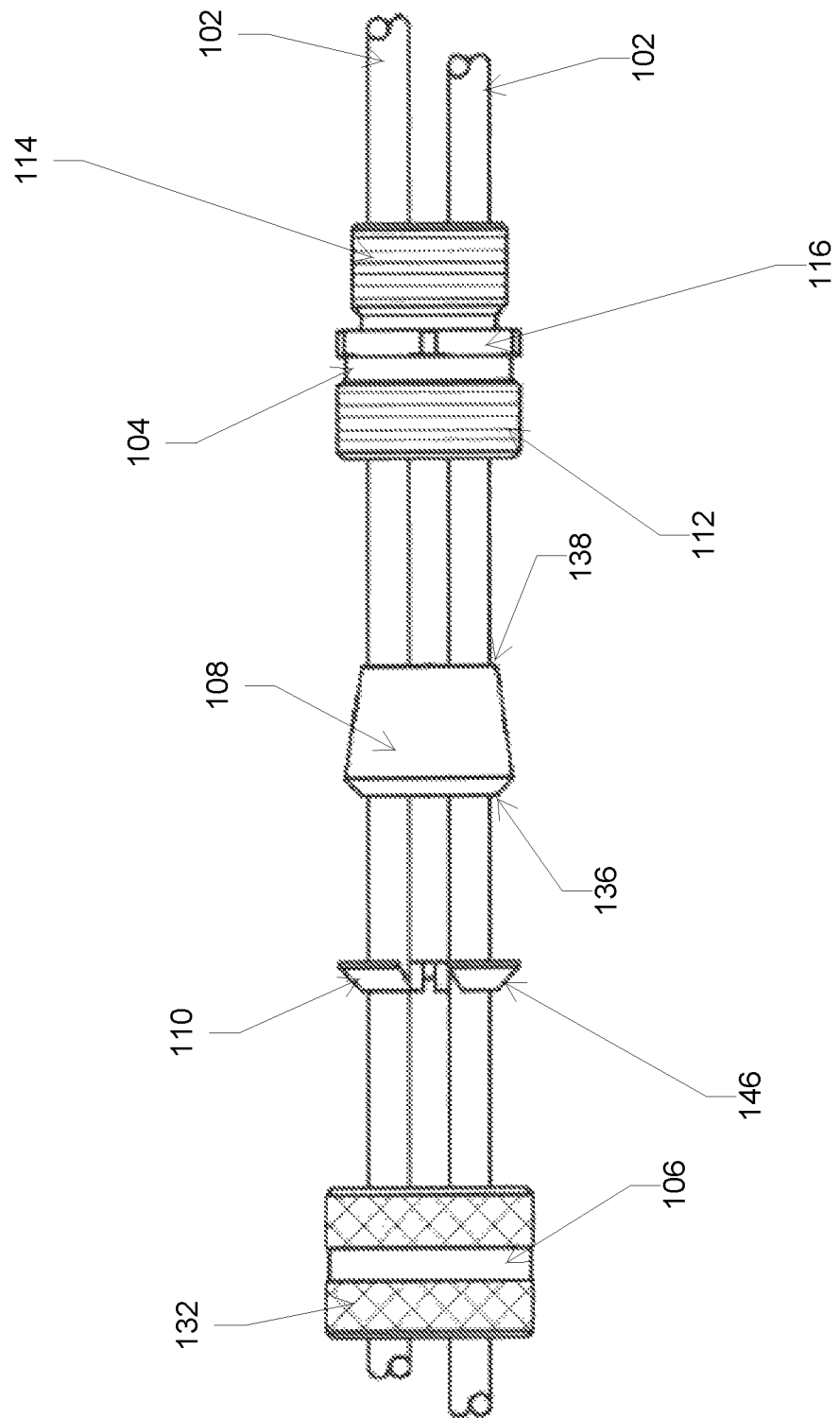
FIG. 2 illustrates a side elevation view of the cord connector of FIG. 1 disassembled and disposed about a plurality of cords.
Figure 3:
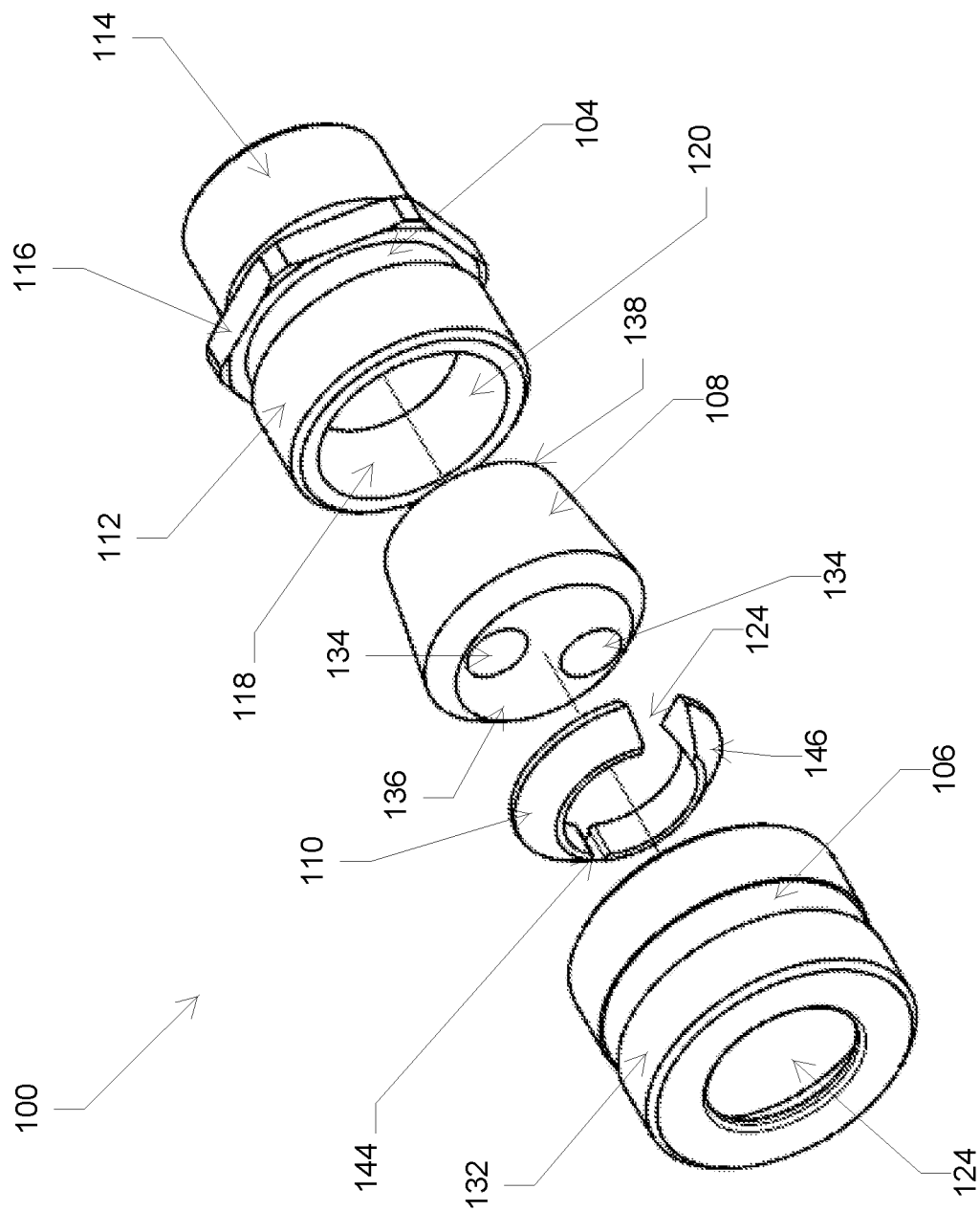
FIG. 3 illustrates an exploded perspective view of the cord connector of FIG. 1.

With reference to FIG. 1, an embodiment of a cord connector 100 is shown. The cord connector 100 is shown assembled in FIG. 1 and exploded along multiple cords 102 in FIG. 2. As best shown in FIG. 3, the cord connector 100 includes a first body 104, a second body 106, a bushing 108, and a clamping ring 110.

The first body 104 is illustrated as a unitary body, but other embodiments may include the first body 104 made of multiple components. The first body 104 may be made of a variety of materials, including one or more metals (aluminum, steel, stainless steel, an alloy, or the like), one or more polymers (such as plastic), some combination thereof, or the like.

The first body 104 includes a male threaded section 112, which is configured to removably receive the second body 106. The first body 104 further includes another male threaded section 114. This other male threaded section 114 is configured to removably couple the cord connector 100 to, for instance, a junction box or other housing. Disposed between the male threaded sections 112, 114 is a series of flats 116 configured for engagement by a tool. These series of flats 116 may facilitate the attachment of the cord connector 100 to the junction box or other housing. The first body 104 further includes a first passage 118 defined therein.

Figure 4:
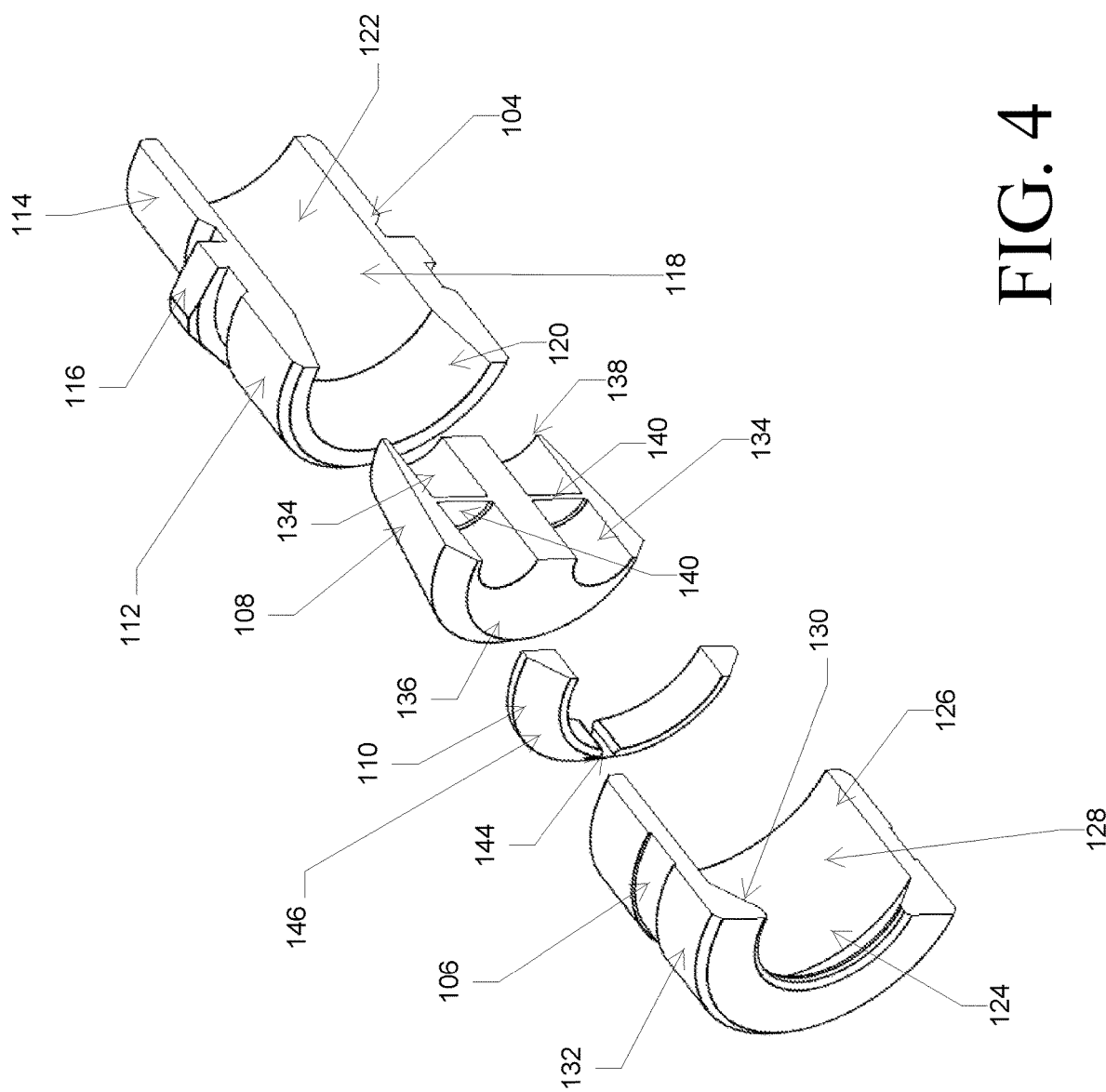
FIG. 4 illustrates a cross-sectional exploded perspective view of the cord connector of FIG. 1.
Figure 5:
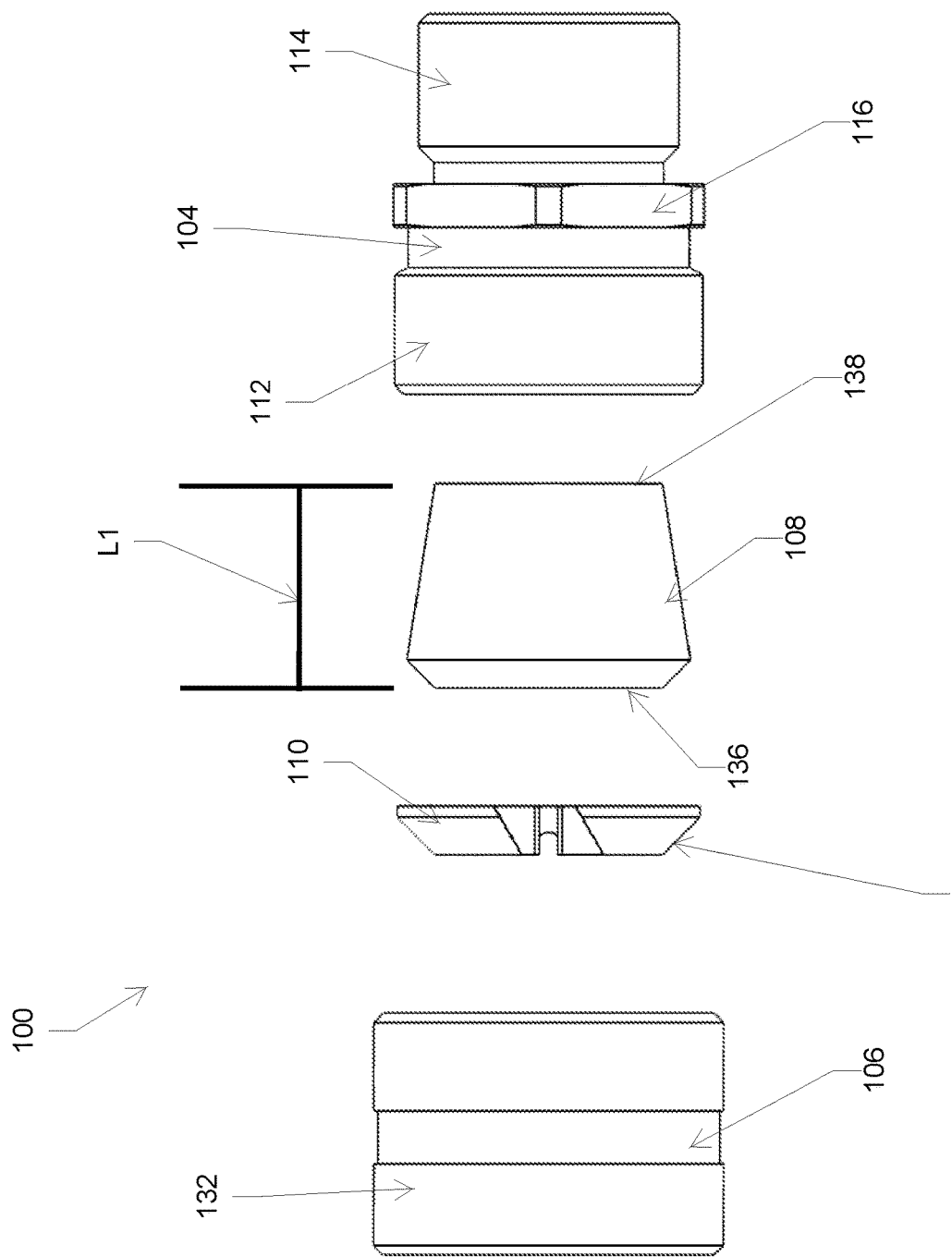
FIG. 5 illustrates an exploded side elevation view of the cord connector of FIG. 1.
Figure 6:
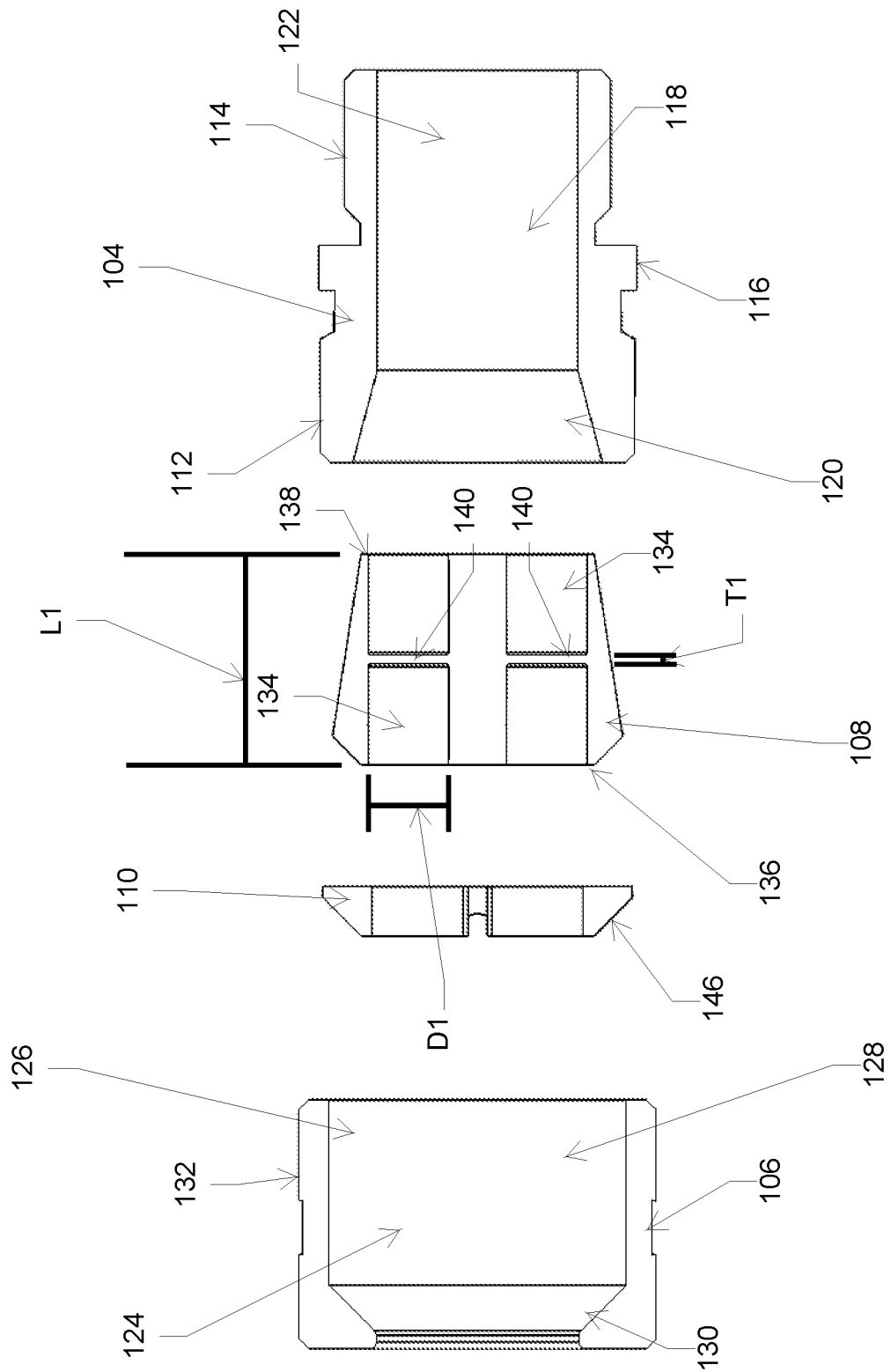
FIG. 6 illustrates a cross-sectional exploded side elevation view of the cord connector of FIG. 1.

As shown in FIGS. 4 and 6, the first passage 118 may include a frustoconical section 120 and a cylindrical section 122 in fluid communication with each other. The shape of the frustoconical section 120 may facilitate the insertion and retention of the bushing 108. The first passage 118 extends completely through the first body 104, such that the one or more cords 102 may pass therethrough.

Returning to FIG. 3, the second body 106 is configured to removably couple to the first body 104. The second body 106 is also illustrated as a unitary body, but other embodiments may include the second body 106 made of multiple components. The second body 106 may be made of a variety of materials, including one or more metals (aluminum, steel, stainless steel, an alloy, or the like), one or more polymers (such as plastic), some combination thereof, or the like.

In the illustrated embodiment, the second body 106 threadingly engages the first body 104. Other embodiments, however, may include the first and second bodies 104, 106 removably coupled to each other in different ways. For instance, the first and second bodies 104, 106 may be removably coupled by detent mechanisms, clamps, straps, screws, bolts, or some other fasteners.

As shown in FIGS. 4 and 6, the second body 106 includes a second passage 124 defined therein. Like the first body 104, the second passage 124 extends completely through the second body 106, such that the one or more cords 102 may pass therethrough. The second body 106 further includes a female threaded section 126 extending along a portion of the second passage 124. In the illustrated embodiment, the female threaded section 126 threadingly engages the male threaded section 112 of the first body 104 to removably couple the second body 106 to the first body 104. The second passage 124 of the second body 106 also includes a cylindrical section 128. In some embodiments, the cylindrical section 128 of the second passage 124 includes the female threaded section 126 therein. The second passage 124 further includes a frustoconical section 130 in fluid communication with the cylindrical section 128. The frustoconical section 130 may be shaped to engage the clamping ring 110 in some embodiments. Also in some embodiments, the frustoconical section 120 of the first passage 118 and the frustoconical section 130 of the second passage 124 may cooperate to compress the bushing 108 and the clamping ring 110 axially toward each other as the first body 104 and the second body 106 are coupled to each other. The frustoconical section 130 of the second passage 124 may also function to retain the clamping ring 110 and/or the bushing 108. In some embodiments, the second body 106 further includes one or more sections of knurling 132 on the outer surface of the second body 106 to facilitate threadingly engaging the first body 104 with the second body 106. Of course, other structures, such as a series of flats, a series of concave indentations, a rubberized section, or some other grip-facilitation may be utilized.

With reference to FIG. 3, the bushing 108 includes a single unitary body formed with two bushing passages 134 extending therethrough from a first end 136 of the bushing 108 to a second end 138 of the bushing 108. Although the bushing passages 134 are illustrated as being circular in cross-section, other cross-sectional shapes (triangular, elliptical, rectangular, pentagonal, hexagonal, or the like) are contemplated herein. The bushing 108 may be made of a polymer, such as rubber. An example of a synthetic rubber suitable for the bushing 108 is neoprene. The bushing 108 may be formed with a generally frustoconical shape so as to fit in the frustoconical section 120 of the first passage 118 to form a liquid-tight seal. The illustrated embodiment of the bushing 108 resembles the shape of a cork or stopper.

As shown in FIGS. 4 and 6, each of the bushing passages 134 are interrupted by a membrane, or continuation, 140 of the bushing 108 disposed along each of the respective bushing passages 134 between the first end 136 and the second end 138 of the bushing 108. In some embodiments, the membrane 140 is disposed midway along a length L1 of the respective bushing passage 134. In some embodiments, the membrane 140 forms a liquid-tight seal across the respective bushing passage 134. In the illustrated embodiment, the membrane 140 has a thickness T1 that is approximately one tenth (10%) of the measurement of the diameter D1 (or width) of the bushing passage 134. Other embodiments may have thicker or thinner membranes 140. The illustrated embodiment may include a membrane 140 that has a thickness T1 of, for instance, less than or equal to 1 millimeter.

Although the illustrated embodiment includes the membrane 140 of each bushing passage 134 being formed as a unitary part with the remainder of the bushing 134, some embodiments may include a membrane 140 that is of a different material from the bushing 134. Such embodiments may include, for instance, the membrane 140 trapped between layers of the bushing 134, affixed to the bushing 134 with adhesive, some combination thereof, or the like.

Figure 7:
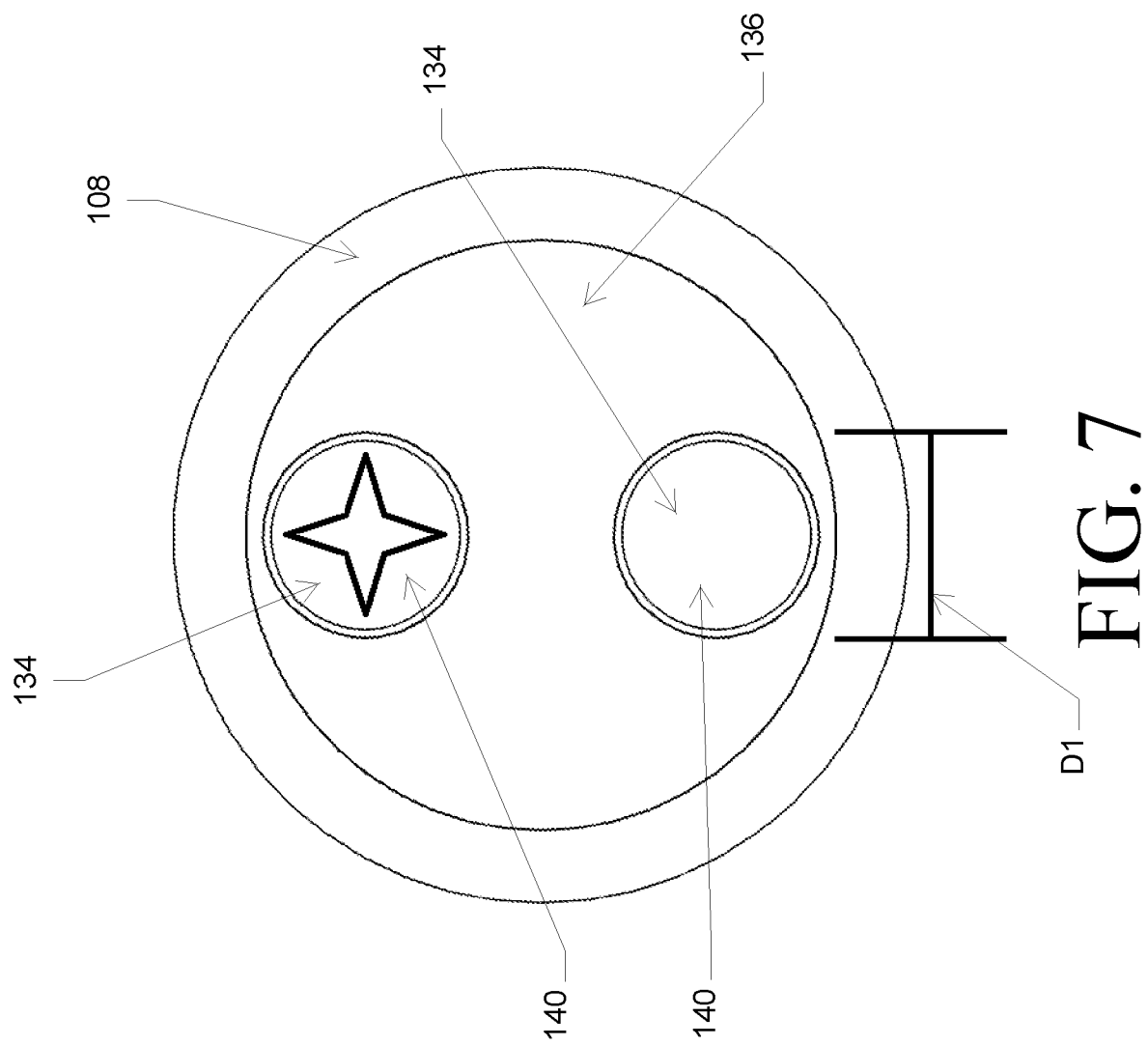
FIG. 7 illustrates a front elevation view of a bushing of the cord connector of FIG. 1.

As shown in FIG. 7, the membrane 140 is configured to be pierced, broken, burst, removed, or otherwise opened to create a fluid communication in the respective bushing passage 134 from the first end 136 to the second end 138 of the bushing 108. In some embodiments, a user may pierce the membrane 140 with, for instance, a screw driver in order to open the bushing passage 134 for insertion of a cord 102 therethrough. In this manner, a user may pierce the desired number of membranes 140 corresponding to the number of cords 102 to be passed through the cord connector 100, leaving the remaining unused bushing passages 134 unpierced and, therefore, sealed without the need for a secondary sealing structure.

With reference to FIG. 3, the cord connector 100 also includes the clamping ring 110. The clamping ring 110 may be made of, for instance, a polymer material. In some embodiments, the clamping ring 110 is made of nylon. The clamping ring 110 includes a gap 142 and a hinge 144. In the illustrated embodiment, the gap 142 and the hinge 144 are diametrically opposed. The clamping ring 110 is placed between the first body 104 and the second body 106 and facilitates in arranging and/or retaining the one or more cords 102 passing through the cord connector 100. In some embodiments, the clamping ring 110 includes a frustoconical surface 146 that is shaped to engage the frustoconical surface 130 of the second passage 124.

Figure 8:
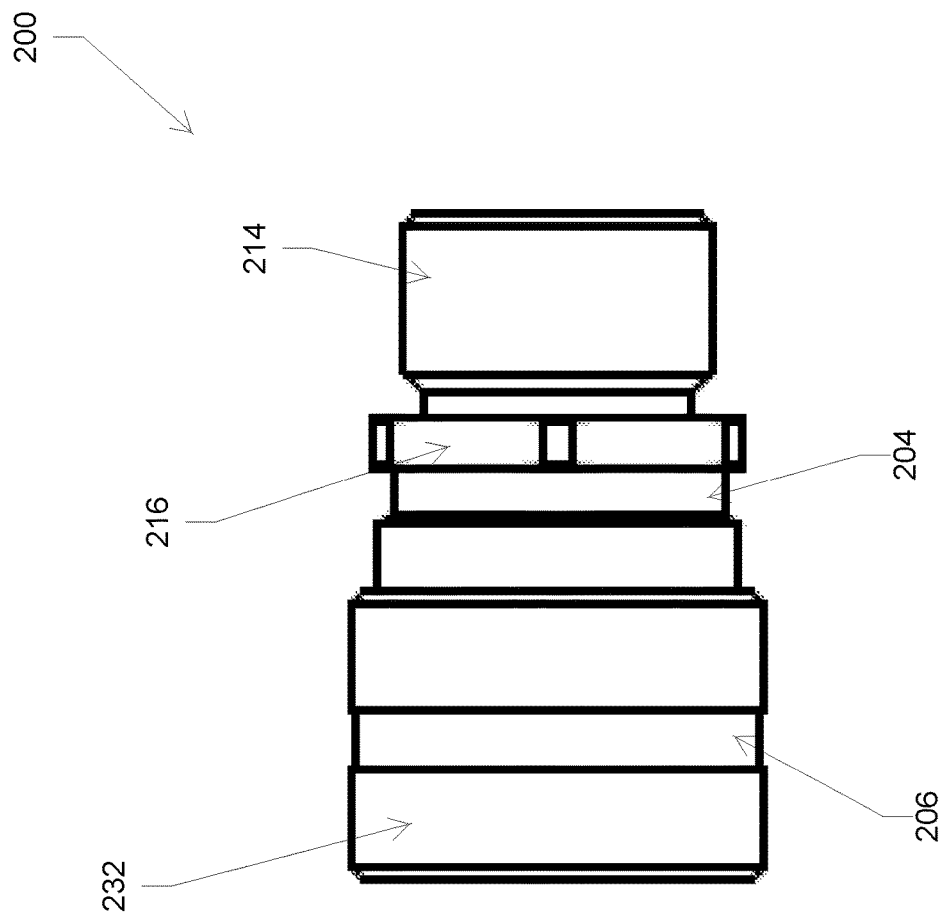
FIG. 8 illustrates a side elevation view of a cord connector, according to embodiments described herein.
Figure 9:
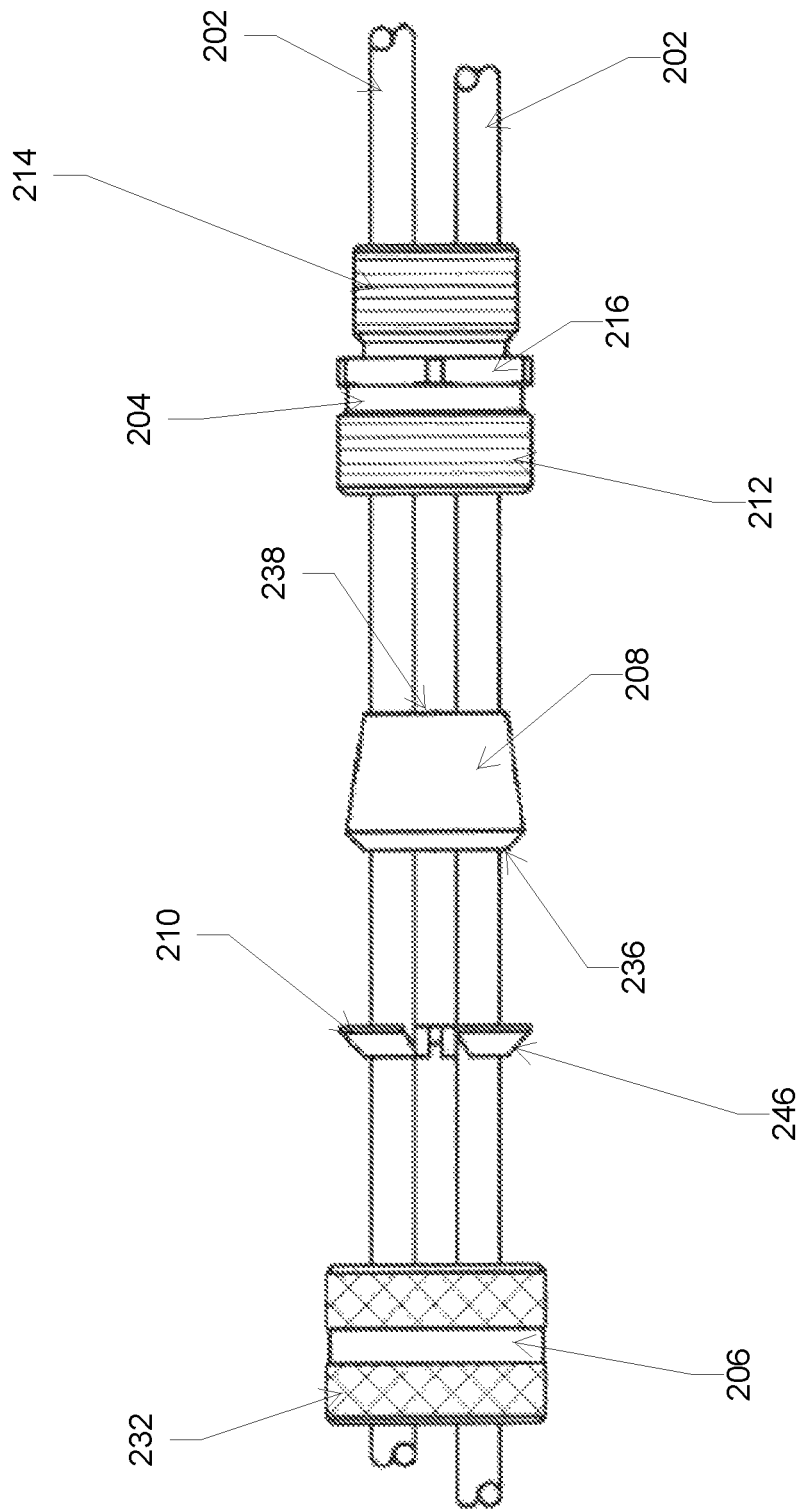
FIG. 9 illustrates a side elevation view of the cord connector of FIG. 8 disassembled and disposed about a plurality of cords.
Figure 10:
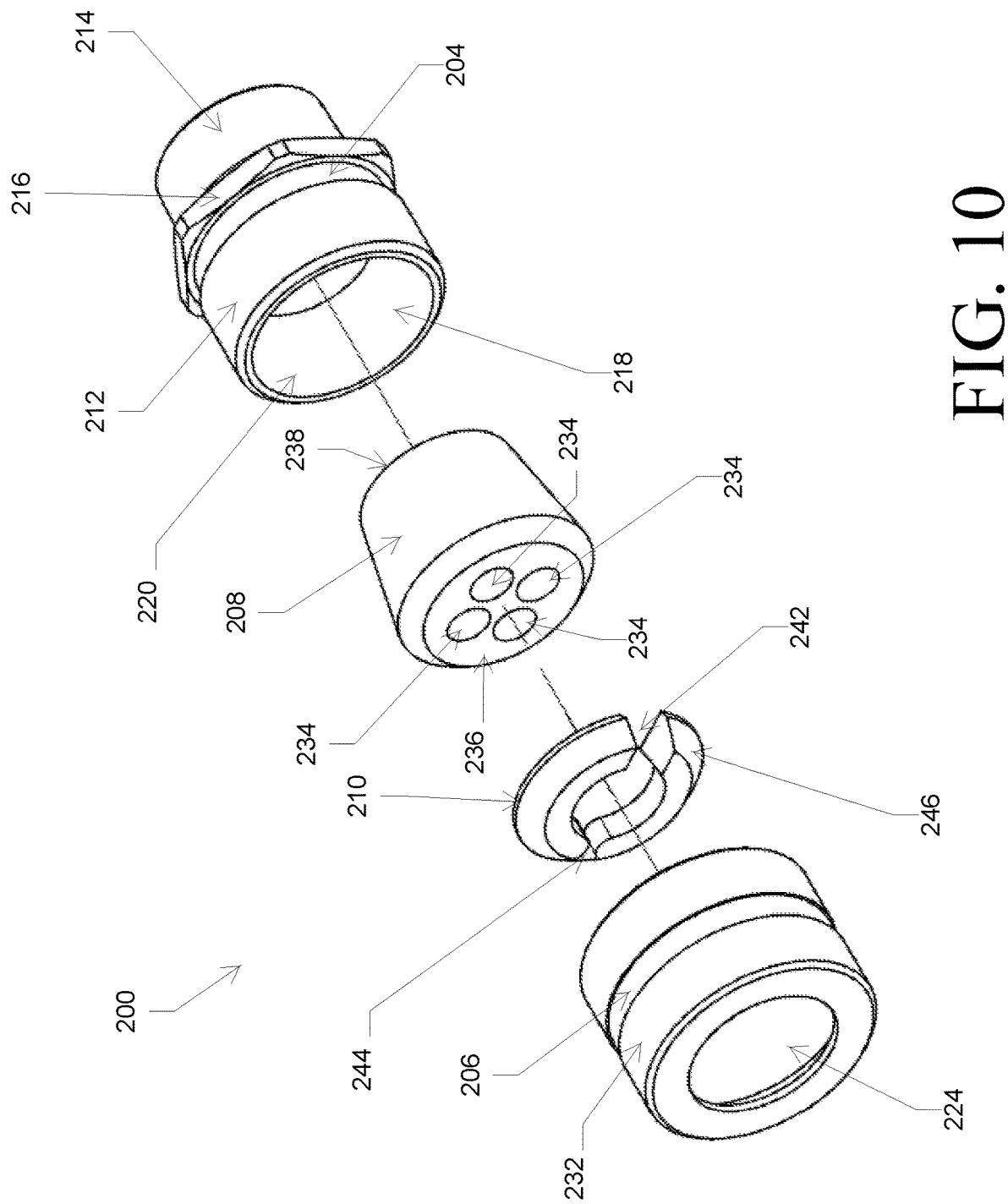
FIG. 10 illustrates an exploded perspective view of the cord connector of FIG. 8.
Figure 11:
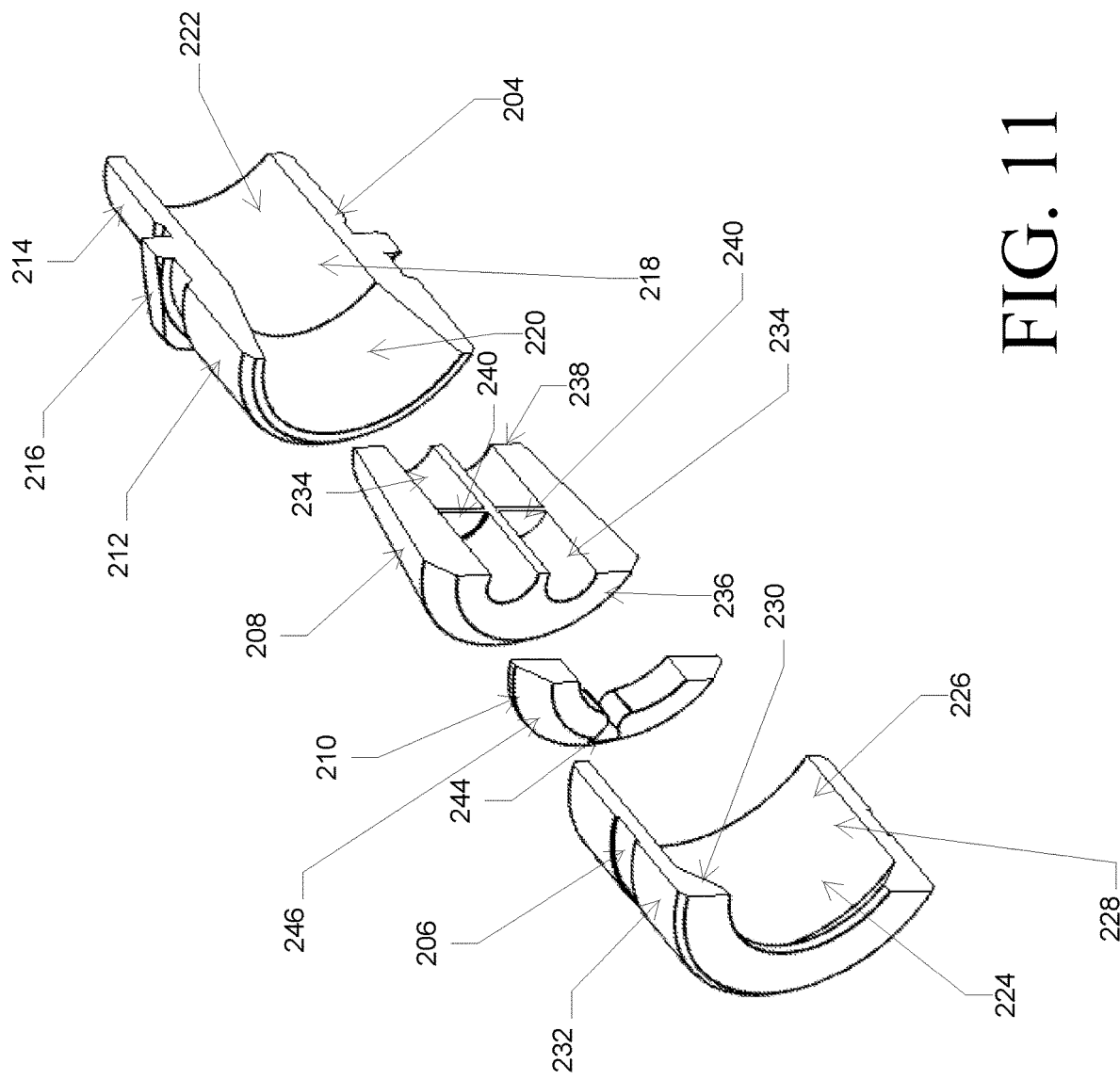
FIG. 11 illustrates a cross-sectional exploded perspective view of the cord connector of FIG. 8.
Figure 12:
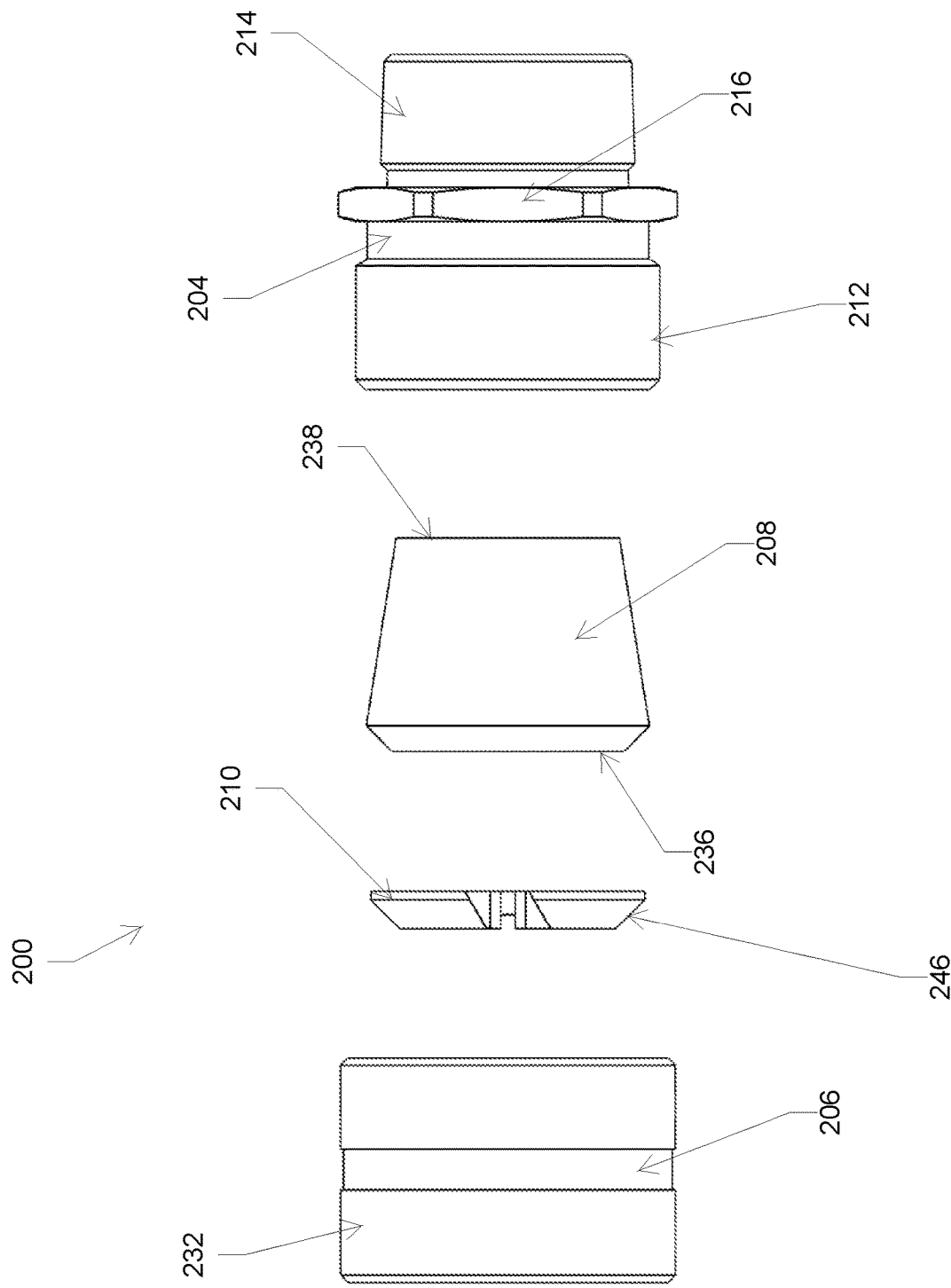
FIG. 12 illustrates an exploded side elevation view of the cord connector of FIG. 8.
Figure 13:
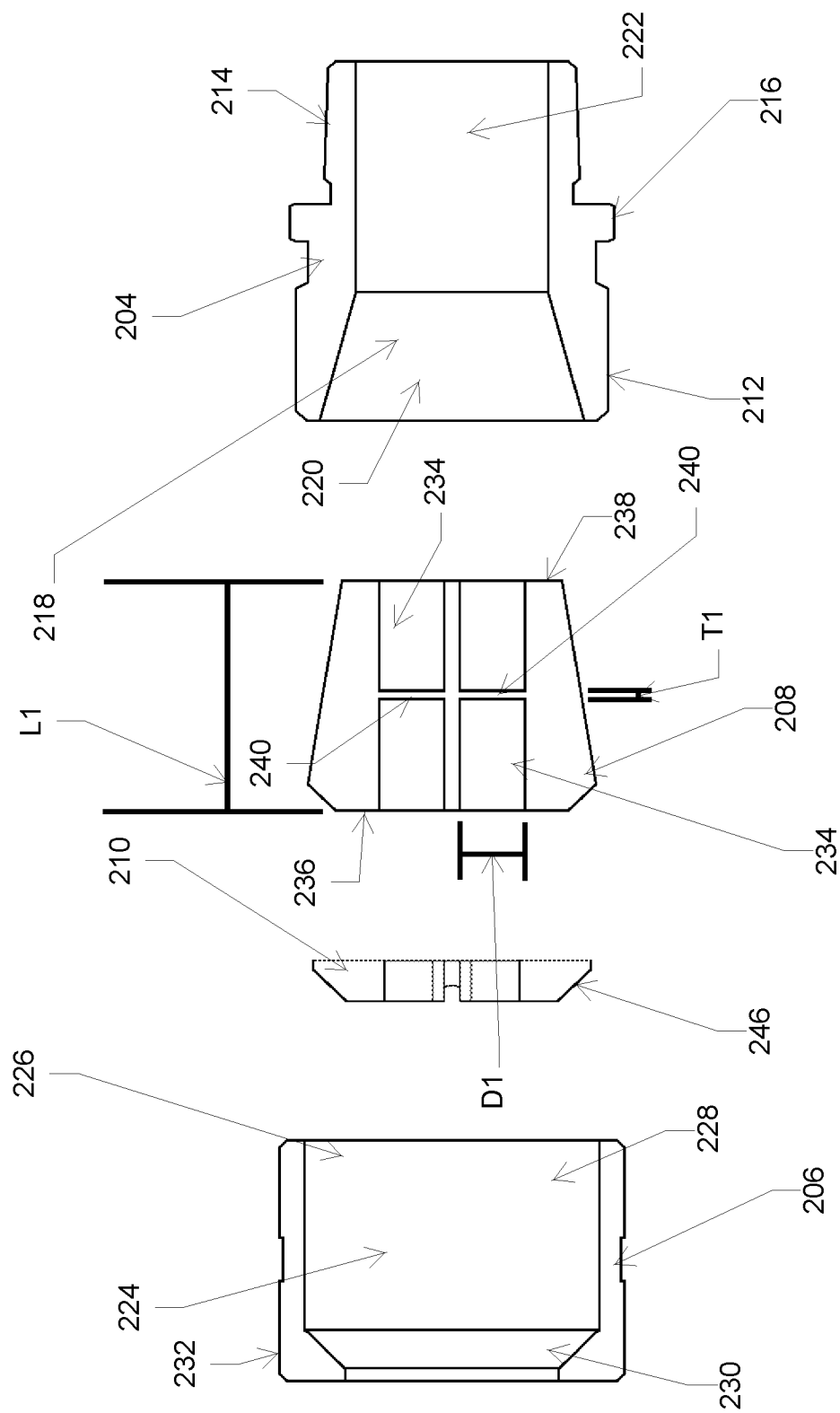
FIG. 13 illustrates a cross-sectional exploded side elevation view of the cord connector of FIG. 8.
Figure 14:
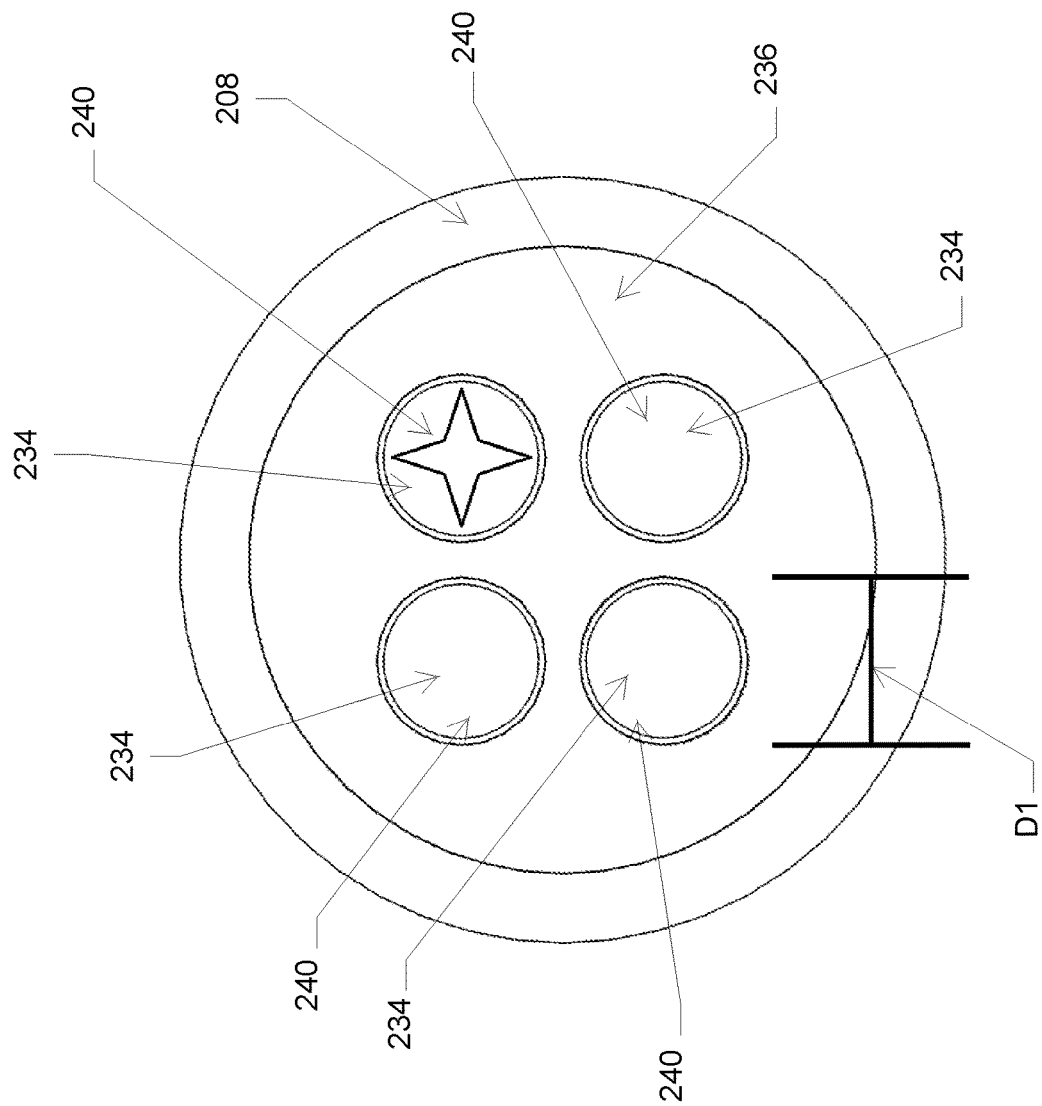
FIG. 14 illustrates a front elevation view of a bushing of the cord connector of FIG. 8.

Turning now to FIG. 8, the present disclosure also contemplates another embodiment of a cord connector 200. This second embodiment of a cord connector 200 shares many components with the cord connector 100 discussed above. Of course, the cord connectors 100, 200 need not be similar as described herein, since the described embodiments are only examples. For the second embodiment of a cord connector 200 described herein, only differences from the cord connector 100 described above will be explored below. Similar components will be numbered with a value of one hundred higher than the corresponding components from the cord connector 100 above, and, as such, may not be explicitly described below in the interest of brevity.

The second embodiment of a cord connector 200 includes four bushing passages 234 defined in the bushing 208. As stated above, each of the bushing passages 234 is at least partially blocked/interrupted by a respective membrane, or continuation, 240 of the bushing 208. In some embodiments, the bushing 208 is larger in diameter to accommodate four cords 202 of the same type as the cords 102 discussed above. In such embodiments, the diameters of the first passage 218 and the second passage 224 may likewise be larger. Other embodiments may include a bushing 208, first body 204, and second body 206 that are similar in size to those discussed above, making the cord connector 200 configured to function with cords 202 that are smaller in diameter than the cords 102 discussed above. The second embodiment of the cord connector 200 functions in substantially the same manner as the cord connector 100 discussed above. The second embodiment of the cord connector 200 is included herein to illustrate that the cord connectors 100, 200 contemplated herein may have any appropriate number of bushing passages 234 and corresponding respective membranes 240. Further embodiments may include more or fewer bushing passages and respective membranes, such as three, five, six, seven, or the like.

As stated above, the illustrated cord connectors 100, 200 may be used for wire/cord management. In some embodiments, the cord connectors 100, 200, may hold the cords 102, 202 in a liquid-tight connection. In some embodiments, the cord connectors 100, 202 may preclude the need for secondary sealing mechanisms to provide the liquid-tight connection.

The present disclosure also relates to a method of using (or a method of installing) a cord connector 100, 200. A user may arrange the cord connector 100, 200 such that the bushing 108, 208 and the clamping ring 110, 210 are disposed between the first body 104, 204 and the second body 106, 206. The user may route a cord, or wire, 102, 202 through the first passage 118, 218 of the first body 104, 204. The user may also pierce the membrane 140, 240 associated with and disposed in the corresponding desired bushing passage 134, 234 of the bushing 108, 208, thereby opening the bushing passage 134, 234 for use. Once the membrane 140, 240 has been broken, the user may route the cord 102, 202 through the bushing passage 134, 234. The cord 102, 202 is also routed through the second passage 124, 224 of the second body 106, 206. The clamping ring 110, 210 is clamped around the one or more cords 102, 202 adjacent the bushing 108, 208, and the bushing 108, 208 and clamping ring 110, 210 are trapped between the first 104, 204 and second 106, 206 bodies by coupling the second body 106, 206 to the first body 104, 204. A user may then attach the cord connector 100, 200 to, for instance, a housing or junction box. The user may leave unused bushing passages 134, 234 unoccupied, thereby leaving their respective membranes 140, 240 unbroken, which allows for the cord connector 100, 200 to form a liquid-tight seal without the need for additional secondary sealing structures.

What is claimed is:

1. A cord connector for holding one or more cords, the cord connector comprising:
    a first body;
    a second body removably coupled to the first body; and
    a bushing disposed between the first body and the second body, the bushing including at least two bushing passages extending from a first end of the bushing toward a second end of the bushing, each bushing passage sealed with a membrane disposed within the bushing passage between the first end and the second end, the membrane configured to be pierced to open the bushing passage.

2. The cord connector of claim 1, wherein each unpierced membrane seals the respective bushing passage such that liquid is unable to pass through the bushing passage from the first end to the second end.

3. The cord connector of claim 1, wherein the at least two bushing passages includes four bushing passages.

4. The cord connector of claim 1, wherein the bushing is made of a polymer material.

5. The cord connector of claim 4, wherein the bushing is made of neoprene rubber.

6. The cord connector of claim 1, wherein the first body includes a first passage, the bushing disposed at least partially within the first passage.

7. The cord connector of claim 6, wherein the first body includes a male threaded section, the male threaded section including the first passage defined at least partially therein.

8. The cord connector of claim 7, wherein the second body includes a female threaded section configured to mate with the male threaded section such that the bushing is trapped between the first body and the second body.

9. The cord connector of claim 1, further comprising a clamping ring disposed between the first body and the second body.

10. The cord connector of claim 9, wherein the clamping ring is made of a polymer material.

11. The cord connector of claim 1, wherein the membrane of each bushing passage is formed as a unitary part with the bushing.

12. The cord connector of claim 11, wherein each membrane includes a thickness that is less than or equal to 1 millimeter.

13. The cord connector of claim 1, wherein each bushing passage is circular in cross-section.

14. A cord connector for holding one or more cords, the cord connector comprising:
    a first body;
    a second body coupled to the first body; and
    a bushing disposed between the first body and the second body, the bushing including a bushing passage extending from a first end of the bushing toward a second end of the bushing, the bushing passage sealed with a membrane disposed within the bushing passage between the first end and the second end, the membrane configured to be pierced to open the bushing passage;
    wherein the membrane of the bushing passage is formed as a unitary part with the busing.

15. The cord connector of claim 14, wherein the bushing includes a frustoconical shape.

16. The cord connector of claim 14, wherein a thickness of the membrane is one-tenth a width of the bushing passage.

17. The cord connector of claim 14, wherein:
    the first body includes a first passage, the bushing disposed at least partially within the first passage;
    the first body includes a male threaded section, the male threaded section including the first passage defined at least partially therein; and
    the second body includes a female threaded section configured to mate with the male threaded section such that the bushing is trapped between the first body and the second body.

18. The cord connector of claim 14, wherein a first distance between the first end and the membrane is equal to a second distance between the second end and the membrane.

19. The cord connector of claim 14, wherein the bushing passage is a first bushing passage and the bushing further includes a second bushing passage that extends from the first end of the bushing toward the second end of the bushing.

20. The cord connector of claim 14, further comprising a clamping ring is disposed between the first body and the second body, the clamping ring having a gap and a hinge opposite to the gap, wherein the clamping ring is movable about the hinge to adjust a size of the gap.

* * * * *